United States Patent [19]

Yamamoto et al.

[11] Patent Number: 5,206,849
[45] Date of Patent: Apr. 27, 1993

[54] OBJECT LENS HOLDER AND DRIVING DEVICE

[75] Inventors: Hiroshi Yamamoto; Ichiro Kawamura; Shoji Goto, all of Osaka, Japan

[73] Assignee: Matsushita Electric Industrial Co., Ltd., Osaka, Japan

[21] Appl. No.: 653,340

[22] Filed: Feb. 11, 1991

[30] Foreign Application Priority Data

Feb. 13, 1990 [JP] Japan .................................. 2-32047

[51] Int. Cl.⁵ .............................................. G11B 7/12
[52] U.S. Cl. ................................. 369/44.16; 359/814; 359/824
[58] Field of Search .......................... 369/44.14–44.16; 359/813, 814, 823, 824

[56] References Cited

U.S. PATENT DOCUMENTS

| | | | |
|---|---|---|---|
| 4,475,179 | 10/1984 | Geyer | 369/44.16 X |
| 4,794,580 | 12/1988 | Ikeda et al. | 369/44.16 |
| 4,911,534 | 3/1990 | Henegouwen et al. | 369/44.16 X |
| 5,072,433 | 12/1991 | Tanaka | 369/44.16 |

FOREIGN PATENT DOCUMENTS 63-50926  3/1988  Japan .

OTHER PUBLICATIONS

Patent Abstracts of Japan, unexamined applications, P field, vol. 13, No. 7, Jan. 10, 1989, p. 106, P 810, JP63-214931.
Patent Abstracts of Japan, unexamined applications, P field, vol. 12, No. 266, Jul. 26, 1988, p. 72, P 735, JP63-50925 and JP63-50926.
Patent Abstracts of Japan, unexamined applications, P field, vol. 13, No. 175, Apr. 25, 1989, p. 4, P 863, JP1-7341.

Primary Examiner—Wayne R. Young
Attorney, Agent, or Firm—Lowe, Price, LeBlanc & Becker

[57] ABSTRACT

An objective lens actuator for an optical storage drive includes a cross-sectionally L-shaped torsion plate spring which is fixed at its central portion to an objective lens holder and at its opposite ends to free ends of a pair of parallel spaced, cantilevered plate springs. The torsion plate spring is caused to twist to displace the objective lens holder and an objective lens mounted thereon in the tracking direction. The parallel spaced plate springs are caused to bend to displace the objective lens holder and the objective lens in the focusing direction.

5 Claims, 4 Drawing Sheets

OBJECT LENS HOLDER AND DRIVING DEVICE

BACKGROUND OF THE INVENTION

1. Field of the Invention

The present invention relates to an objective lens actuator for an optical recording/reproducing apparatus such as an optical storage drive for optically recording and reading information by a laser beam focused on an optical recording medium such as an optical disk.

2. Description of the Prior Art

In recent years, intense interest has been shown towards optical recording/reproducing apparatus as a unit of equipment which is capable of recording, reproducing and erasing information on the recording medium.

In such optical recording/reproducing apparatus, a laser beam emitted from a semiconductor laser is focused on a rotating optical disk and the reflected light or transmitted light is detected to regenerate signals representing pieces of information or data recorded on the optical disk. To this end, the apparatus needs a tracking control for projecting a laser beam onto a desired position on the optical disk, and a focus control for accurately focusing the laser beam on the optical disk. In general, these controls are accomplished by displacing an objective lens by means of an objective lens actuator.

One such known objective lens actuator is disclosed in Japanese Patent Laid-open Publication No. 63-50926. The disclosed objective lens actuator includes, as reillustrated here in FIGS. 7 through 9, a wire member 1 fixed at its central portion to an objective lens holder 2, a pair of parallel spaced plate springs 4 supported at one end by a stationary support member 3 and joined at the opposite end with the opposite ends of the wire member 1 for supporting the objective lens holder 2, and an objective lens 5 fixedly mounted on the objective lens holder 2 with its optical axis spaced from, and substantially parallel with, an axis of the wire member 1. The objective lens holder 2 has a substantially cylindrical shape and holds a longitudinal axis substantially in common with the wire member 1. A focusing coil 6 is wound around the periphery of the cylindrical objective lens holder 2. Four substantially rectangular tracking coils 7 are disposed on an outer surface of the focusing coil 6 and equidistant from one another in the circumferential direction of the objective lens holder 2.

A magnetic circuit base 8 includes a pair of arcuate, diametrically opposed first arcuate magnetic yokes 8a, 8a integral with the magnetic circuit base 8, and a pair of arcuate, diametrically opposed second magnetic yokes 8b, 8b disposed radially outwardly of the first magnetic yokes 8a, 8a, respectively, and mounted on the magnetic circuit base 8 with a pair of arcuate, diametrically opposed permanent magnets 9, 9 disposed between the corresponding second magnetic yokes 8b, 8b and the magnetic circuit base 8. The first magnetic yokes 8a are received in a pair of axial holes 10 formed in the objective lens holder 2. The stationary support member 3 is secured to the magnetic circuit base 8 in such a manner that the axis of the wire member 1 is substantially aligned with a common axis of the arcuate first and second yokes 8a, 8b and arcuate magnets 9.

With this construction, when a tracking control current flows through the tracking coils 7 of the objective lens actuator, the objective lens holder 2 is subjected to a rotational force which in turn causes the wire member 1 to twist, thereby turning the objective lens holder 2 about the axis of the wire member 1. The tracking control of the objective lens 5 is thus performed. When a focus control current flows through the focus control coil 6, the objective lens holder 2 is subjected to a driving force acting in a direction parallel to the axis of the wire member 1. The driving force causes the parallel spaced plate springs 4 to flex, displacing the objective lens holder 2 in a direction parallel to the axis of the wire member 1. The focus control of the objective lens 5 is thus performed.

The wire member 1 of the conventional objective lens actuator has a relatively large spring constant in a direction circumferential about its own axis (this direction being referred to as "tracking direction") and a relatively small spring constant in a direction perpendicular to its own axis (this direction being referred to as "focusing direction"). Yet, a free selection of the ratio between these two spring constants is substantially impossible. Since the displacement of the objective lens 5 in the tracking direction relies on the twist of the wire member 1, the wire member 1 having a relatively large spring constant in the same direction has a high primary resonance frequency. In this case, resonance vibration takes place at a very high frequency level which is no longer possible to lower or dampen by means of a viscoelastic member. An acceleration during a high speed access or an external vibration or shock acts in a direction perpendicular to the axis of the wire member 1, the wire member 1 which is supported on the free ends of the cantilevered parallel plate springs 4 is freely bendable depending on a force exerted on the objective lens holder 2. Due to this bending of the wire member 1, the central axis of a laser beam which is incident upon the objective lens 5 is misaligned with, or tilts with respect to, the optical axis of the objective lens 5.

The foregoing extremely high resonance frequency level and the misalignment between the laser beam and the optical axis of the objective lens 5 exert negative influence on the servo characteristics of the objective lens actuator. Thus, an accurate recording/reproducing of signals is difficult to perform.

SUMMARY OF THE INVENTION

With the foregoing difficulties of the prior art in view, it is an object of the present invention to provide an objective lens actuator which has an optimum primary resonance frequency in the tracking direction and the resulting level of resonance vibration and is capable of performing a stable control of an objective lens even at the time of high speed accessing or when subjected to an external vibration or shock.

An objective lens actuator of this invention includes a torsion plate spring in place of the wire member of the conventional actuator. The torsion plate spring has a substantially L-shaped cross section in a direction perpendicular to the optical axis of an objective lens. The torsion plate spring is fixed, at its central portion, to an objective lens holder and, at its opposite ends, to free ends of a pair of parallel spaced plate springs which are cantilevered, or supported at only one end, by a stationary support member. The objective lens is fixedly mounted on the objective lens holder with its optical axis spaced from, and substantially parallel to, a longitudinal axis of the torsion plate spring. The objective lens holder is driven by magnetic circuits and coils in a direction parallel to the optical axis of the objective lens and in a direction circumferential about the longitudinal axis of the torsion plate spring.

With this construction, when the tracking coils are excited by a tracking current, the torsion plate spring is caused to twist, thereby turning the objective lens holder about the longitudinal axis of the torsion plate spring. On the other hand, when the focusing coil is excited by a focusing current, the parallel spaced plate springs are caused to bend, thereby displacing the objective lens holder in a direction parallel to the longitudinal axis of the torsion coil spring. Thus, the optical axis of the objective lens is kept always perpendicular to the plane of an optical disk (not shown). The torsion plate spring has a very low spring constant in the tracking direction (i.e., the circumferential direction about the longitudinal axis of the torsion plate spring) and is substantially rigid in the focusing direction (i.e., the direction perpendicular to the longitudinal axis of the torsion plate spring). With this torsion plate spring, the primary resonance frequency in the tracking direction and the resulting level of resonance vibration can be optimized. Furthermore, the movement of the objective lens holder can be controlled stably and accurately without causing undesired misalignment and tilting even at the time of high speed accessing or when subjected to an external vibration or shock.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
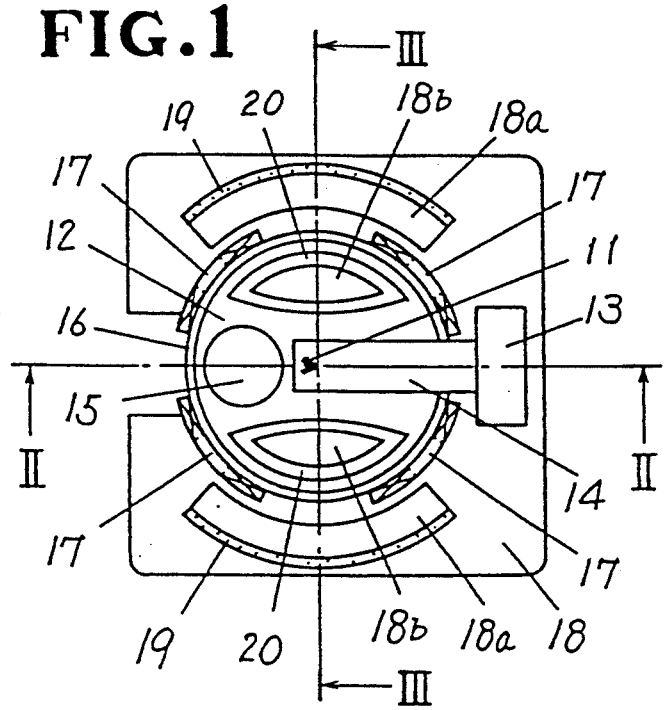
FIG. 1 is a plan view of an objective lens actuator according to the present invention.
Figure 2:
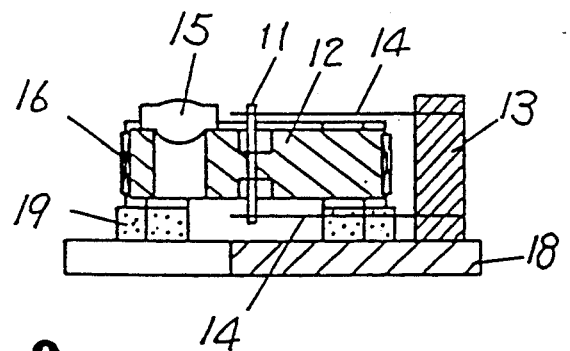
FIG. 2 is a cross-sectional view taken along line II—II of FIG. 1.
Figure 3:
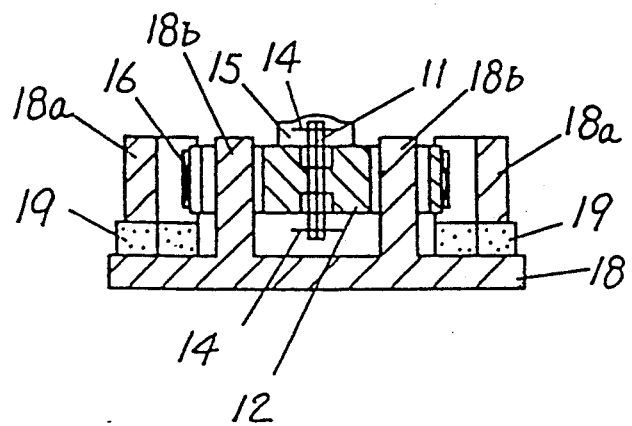
FIG. 3 is a cross-sectional view taken along line III—III of FIG. 1.
Figure 4:
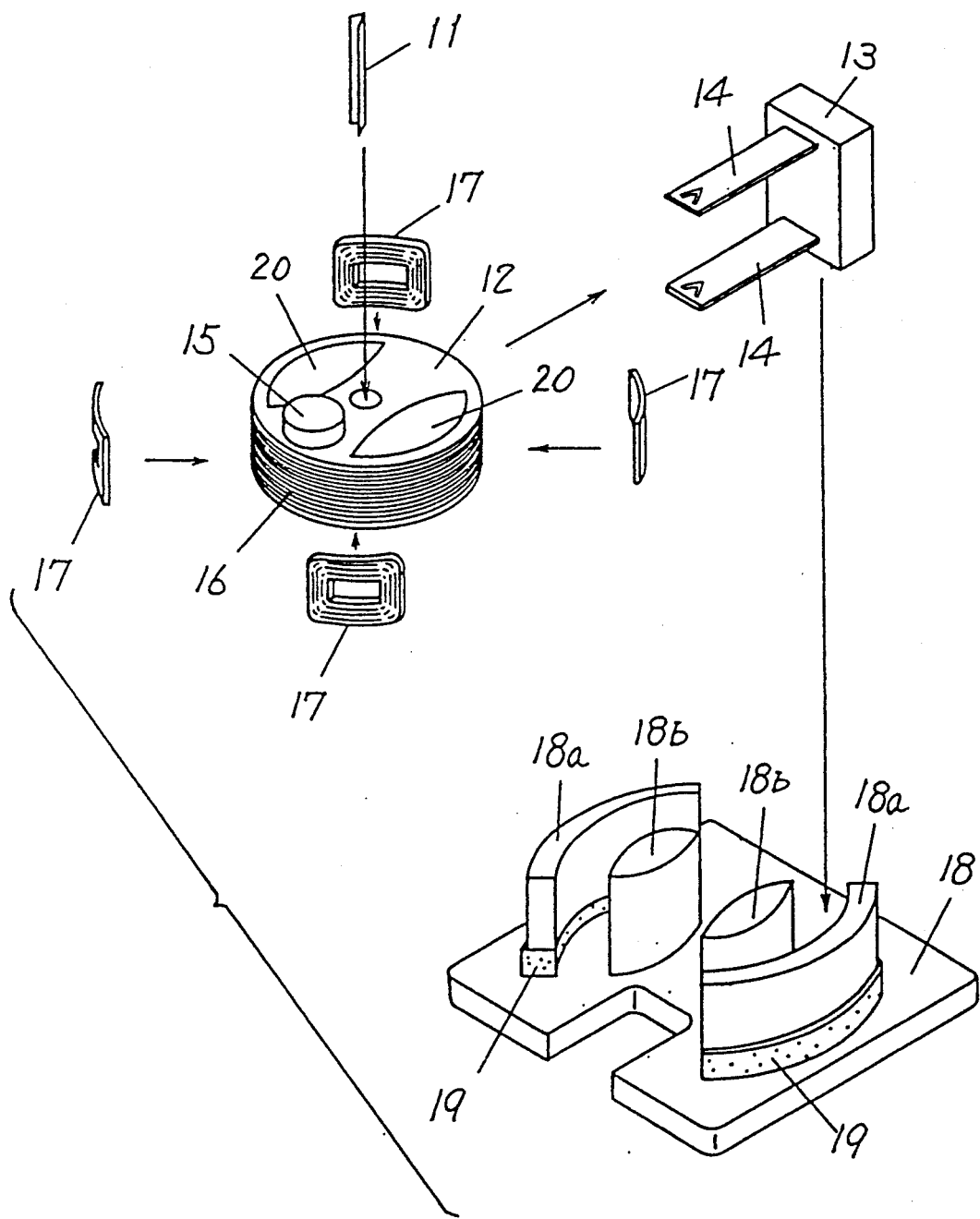
FIG. 4 is an exploded view of the objective lens actuator.

FIGS. 1 through 4 show an objective lens actuator according to one embodiment of this invention.

The objective lens actuator includes a torsion plate spring 11 having an L-shaped transverse cross section. The torsion plate spring 11 is fixed, at its central portion, to an objective lens holder 12 and, at its opposite ends, to free ends of a pair of parallel spaced plate springs 14, 14 which are cantilevered, or supported at only one end, by a stationary support member 13. An objective lens 15 is fixedly mounted on the objective lens holder 12 with its optical axis spaced from, and substantially parallel to, an longitudinal axis of the torsion plate spring 11.

The objective lens holder 12 has a substantially cylindrical shape and holds a longitudinal axis substantially in common with the torsion plate spring 11. A focusing coil 16 is wound around an outer peripheral surface of the objective lens holder 12. Four substantially rectangular tracking coils 17 are disposed on an outer surface of the focusing coil 16 at substantially equal angular intervals in the circumferential direction of the objective lens holder 12.

A magnetic circuit base 18 includes a pair of arcuate, diametrically opposed first arcuate magnetic yokes 18a, 18a formed integrally with the magnetic circuit base 18, a pair of arcuate, diametrically opposed second magnetic yokes 18b, 18b disposed radially outwardly of the first magnetic yokes 18a, 18a, respectively, and mounted on the magnetic circuit base 18 with a pair of arcuate, diametrically opposed permanent magnets 19, 19 disposed between the corresponding second magnetic yokes 18b and the magnetic circuit base 18. The first magnetic yokes 18a are received in a pair of axial holes 20 formed in the objective lens holder 12. The second magnetic yokes 18b are disposed radially outwardly of the objective lens holder 12. The stationary support member 13 is secured to the magnetic circuit base 18 in such a manner that the longitudinal axis of the torsion plate spring 11 is substantially aligned with a common axis of the arcuate first and second yokes 18a, 18b and arcuate magnets 19. The magnetic circuit base 18, first and second yokes 18a, 18b, magnets 19, and objective lens holder 12 jointly constitute a first magnetic circuit which is cooperative with the tracking coils 17 to move the objective lens holder 12 in the tracking direction. Likewise, the magnetic circuit base 18 and the objective lens holder 12 jointly constitute a second magnetic circuit which is cooperative with the focusing coil 16 to move the objective lens holder 12 in the focusing direction.

With this construction, when a tracking control current flows through the tracking coils 17 of the objective lens actuator, the objective lens holder 12 is subjected to a rotational force acting in the circumferential direction about the longitudinal axis of the torsion plate spring 11. The torsion plate spring 11 is caused by this rotational force to twist, thereby turning the objective lens holder 12 about the longitudinal axis of the torsion plate 1. The tracking control of the objective lens 15 is thus performed. When a focus control current flows through the focus control coil 16, the objective lens holder 12 is subjected to a driving force acting in the direction parallel to the longitudinal axis of the torsion plate spring 11. The torsion plate spring 11 is caused by this driving force to bend, thereby displacing the objective lens holder 12 in a direction parallel to the axis of the torsion plate spring 11. The focus control of the objective lens 5 is thus performed.

The objective lens 15 is, therefore, drivable both in the tracking direction and the focusing direction without the occurrence of undesired tilting of its optical axis. Thus, the optical axis of the objective lens 15 can be always kept perpendicular to the plane of an optical disk (not shown).

Figure 5:
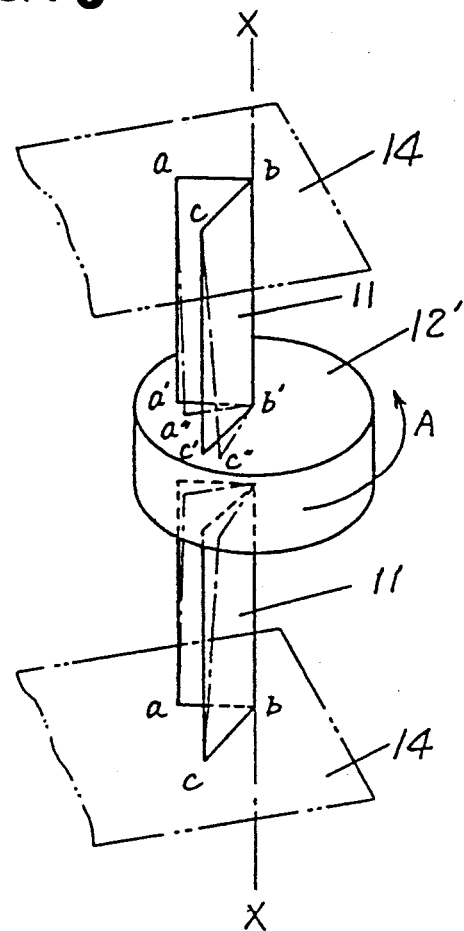
FIG. 5 is a diagrammatical view, on enlarged scale, of a torsion plate spring and related parts thereof.

The operation of the torsion plate spring 11 will be described below in greater detail with reference to FIG. 5. Two sides a-b and c-b of each end of the torsion plate spring 11 is fixed to the corresponding plate spring 14.

When a central portion 12' of the objective lens holder 12 is turned about the axis X—X in the direction of the arrow A through a certain angular distance, points a' and c' of the torsion plate spring 11 are angularly displaced about the axis X—X to the points a", c", respectively, by virtue of the twist of upper elongate rectangular portions a,b,b',a' and c,b,b',c' of the torsion plate spring 11. This is also true when the central portion 12' of the objective lens holder turns in the opposite direction to the arrow A. When the torsion plate spring is twisted, a point of resilient deformation of the torsion plate spring shifts or changes continuously. With the use of the torsion plate spring, a stress concentration, which may occur when a hinged structure is used, can be avoided.

Figure 6A:
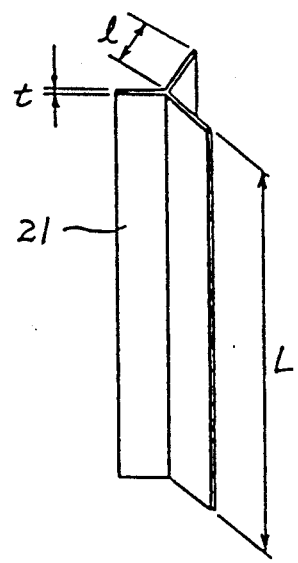
FIG. 6(a) is a perspective view of a torsion plate spring according to another embodiment.
Figure 6B:
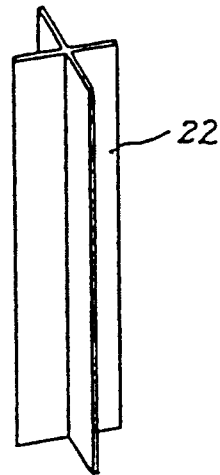
FIG. 6(b) is a perspective view of a torsion plate spring according to still another embodiment.
Figure 7:
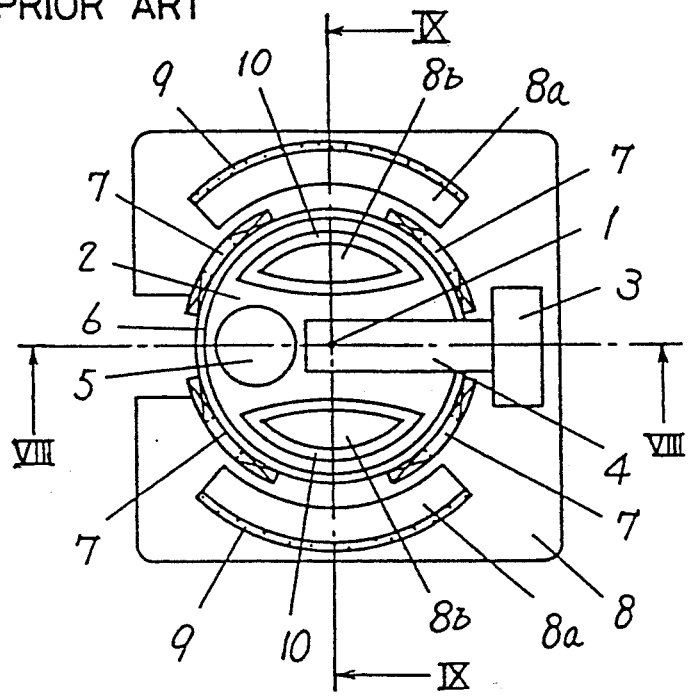
FIG. 7 is a plan view of a conventional objective lens actuator.
Figure 8:
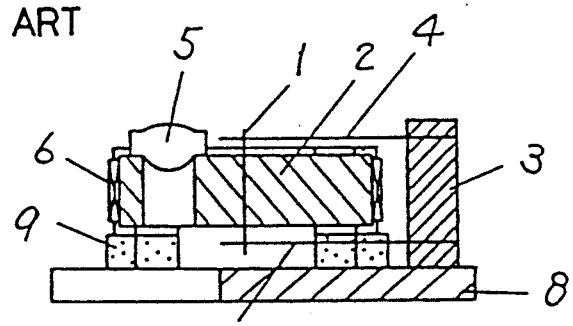
FIG. 8 is a cross-sectional view taken along line VIII—VIII of FIG. 7.
Figure 9:
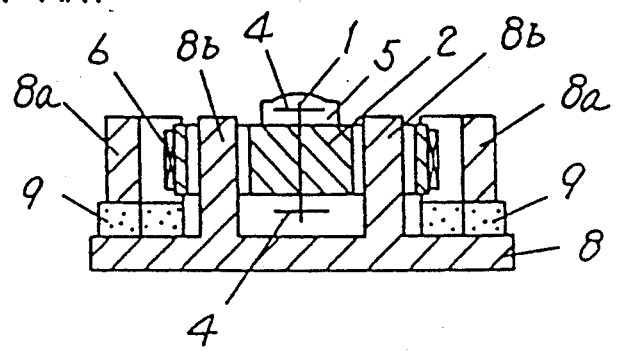
FIG. 9 is a cross-sectional view taken along line IX—IX of FIG. 7.

FIGS. 6(a) and 6(b) show modified forms of the torsion plate spring. The torsion plate spring 21 shown in FIG. 6(a) has a substantially Y-shaped transverse cross section. The torsion plate spring 22 shown in FIG. 6(b) has a substantially X-shaped transverse cross section. Each of the torsion plate springs 21, 22 derives from a combination of two such torsion plate spring 11 having a substantially L-shaped transverse cross section and has the same effect as the torsion plate spring 11. The thickness t, width l and length L of the torsion plate spring (see FIG. 6(a)) can be selected freely so as to provide a desired spring force in the circumferential direction about its own longitudinal axis and a desired mechanical rigidity in the direction perpendicular to its longitudinal axis.

As described above, the objective lens is displaced in the tracking direction by using twist of the torsion plate spring having a substantially L-shaped transverse cross section. Since the thickness, width and length of such torsion plate spring can be selected freely to provide a desired spring force in the tracking direction and a desired mechanical rigidity in the direction perpendicular to the optical axis of the objective lens. With this unrestricted dimensional selection, it is possible to optimize the primary resonance frequency in the tracking direction and also to lower the resonance level of the parallel plate springs without difficulty. Furthermore, the objective lens holder can always be held in a predetermined posture or orientation without causing undesired displacement or tilting even at the time of high speed accessing or when subjected to an external vibration or shock. Thus, the movement of the objective lens can be controlled stably and accurately. When the torsion plate spring is twisted, a torsional force exerted on the central portion of the torsion plate spring is distributed continuously and gradually toward the opposite fixed ends. The torsion plate spring is, therefore, free from stress concentration which might be occur when a hinged structure is used. With the use of the torsion plate spring, a long mechanical stroke in the tracking direction is available and hence the linearity of the spring characteristics is improved. The objective lens actuator having the torsion plate spring is simple in construction and reliable in operation, can be manufactured at a low cost and is suitable for mass production.

Obviously various minor changes and modifications of the present invention are possible in the light of the above teaching. It is therefore to be understood that within the scope of the appended claims the invention may be practiced otherwise than as specifically described.

What is claimed is:

1. An objective lens actuator for an optical storage drive, comprising:
   an objective lens holder;
   a torsion plate spring disposed on a center of rotation of said objective lens holder and having a central portion fixed to said objective lens holder, said torsion plate spring having a substantially L-shaped transverse cross section;
   a pair of parallel spaced plate springs each supported at one end by a stationary support member and fixedly connected at an opposite end to respective opposite ends of said torsion plate spring;
   a magnetic circuit base carrying thereon said stationary support member;
   an objective lens fixedly mounted on said objective lens holder with its optical axis spaced from, and substantially parallel to, a longitudinal axis of said torsion plate spring; and
   means for driving the objective lens holder and the objective lens mounted thereon, said driving means including a plurality of tracking coils and a first magnetic circuit which are cooperative with each other to move said objective lens holder in a direction circumferentially about the longitudinal axis of said torsion plate spring, and a focusing coil and a second magnetic circuit which are cooperative with each other to move said objective lens holder in a direction parallel to the longitudinal axis of said torsion plate spring.

2. An objective lens actuator according to claim 1, wherein said longitudinal axis of said torsion plate spring extends through a center of gravity of said objective lens holder.

3. An objective lens actuator according to claim 2, wherein said objective lens holder has a substantially cylindrical shape, said longitudinal axis of said torsion plate spring being aligned with a longitudinal axis of said cylindrical objective lens holder.

4. An objective lens actuator according to claim 1, wherein said torsion plate spring has a substantially Y-shaped transverse cross section.

5. An objective lens actuator according to claim 1, wherein said torsion plate spring has a substantially X-shaped transverse cross section.

* * * * *